US008503776B2

(12) United States Patent
Kim et al.

(10) Patent No.: US 8,503,776 B2
(45) Date of Patent: Aug. 6, 2013

(54) APPARATUS AND METHOD FOR PROVIDING DISPLAY INFORMATION FOR COLOR CALIBRATION OF DISPLAY DEVICE

(75) Inventors: Jin Seo Kim, Daejeon (KR); Maeng Sub Cho, Daejeon (KR); Ki-Hong Kim, Daejeon (KR); Soon Young Kwon, Daejeon (KR); Juyeon You, Daejeon (KR); Song Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 604 days.

(21) Appl. No.: 12/787,510

(22) Filed: May 26, 2010

(65) Prior Publication Data

US 2011/0084989 A1 Apr. 14, 2011

(30) Foreign Application Priority Data

Oct. 9, 2009 (KR) ........................ 10-2009-0096010
Dec. 21, 2009 (KR) ........................ 10-2009-0127864

(51) Int. Cl.
*G06K 9/00* (2006.01)

(52) U.S. Cl.
USPC .......................................................... 382/167

(58) Field of Classification Search
USPC .................. 382/162–167, 274; 345/581, 589, 345/590, 600, 619; 348/187, 188, E9.053; 358/1.9, 504, 515, 518–520
See application file for complete search history.

(56) References Cited

U.S. PATENT DOCUMENTS 7,190,372 B2 * 3/2007 Choi et al. .................... 345/589
7,663,668 B2 * 2/2010 Kuno et al. ................ 348/222.1
7,715,047 B2 * 5/2010 Momose et al. ............... 358/1.9
8,035,688 B2 * 10/2011 Snyderman et al. .......... 348/187
2005/0231741 A1 10/2005 Cho et al.
2006/0152529 A1 7/2006 Matsuda
2007/0132790 A1 6/2007 Miller

FOREIGN PATENT DOCUMENTS

JP 2006-091521 4/2006
KR 10-2005-0097091 10/2005
KR 10-2009-0109660 10/2009

OTHER PUBLICATIONS

B. Bastani et al., "End-User DLP Projector Colour Calibration", AIC Colour 05-10$^{th}$ Congress of the International Colour Association, pp. 1227-1230.

* cited by examiner

*Primary Examiner* — Jose Couso
(74) *Attorney, Agent, or Firm* — Staas & Halsey LLP

(57) ABSTRACT

An apparatus for providing display information for color calibration of a display device includes an input unit for inputting user input information; and a preprocessing unit for preprocessing the user input information input by the input unit to generate a color patch for brightness adjustment and a color patch for contrast adjustment. Further, the apparatus for providing the display information for the color calibration of the display device includes a color patch display unit for displaying and outputting the color patch for brightness adjustment and the color patch for contrast adjustment that are generated by the preprocessing unit.

18 Claims, 4 Drawing Sheets

APPARATUS AND METHOD FOR PROVIDING DISPLAY INFORMATION FOR COLOR CALIBRATION OF DISPLAY DEVICE

CROSS-REFERENCE TO RELATED APPLICATIONS

The present invention claims priority of Korean Patent Application No. 10-2009-0096010, filed on Oct. 9, 2009, and Korean Patent Application No. 10-2009-0127864, filed on Dec. 21, 2009, which is incorporated herein by references.

FIELD OF THE INVENTION

The present invention relates to a display technique for color calibration of a display device; and more particularly, to an apparatus and method for providing display information for color calibration of a display device, which are suitable to promote color calibration so as to always keep the color characteristics of a digital projector constant in a screen service space, such as a digital cinema theater.

BACKGROUND OF THE INVENTION

In recent years, the number of digital cinema screens using projectors is gradually increasing. Thus, accurate color calibration of a digital projector becomes an important factor in determining the consistency of the color quality of films being shown. For the calibration of a digital cinema projector, a huge amount of money has been paid so far to expensive measuring equipment and skilled experts.

In general, each screen theater hires an outside professional agency to perform the calibration of projectors about once every six months or every year. In the case of multiplex theaters, there are a lot of problems technically and economically in periodically managing a number of projectors.

The calibration of digital video equipment is a step of always keeping the color characteristics represented by the equipment constant, which is the most basic task in providing a video playback service.

For existing film type movies, there was no choice but to manage the lamp of a projector in order to perform separate calibration by the projector. However, with the arrival of the era of digital cinema, it has become possible to finely adjust the color representation characteristics of a digital cinema projector using computer software. In other words, while the color quality of a movie projected by a film projector did not change a lot even if no separate calibration operation was done, the color quality of a movie projected by a digital projector may change by a slight change in the settings. Moreover, since color quality may change with time even with the same settings, calibration has to be performed always accurately to always maintain the same color quality.

Projectionists who currently operate digital cinema projectors in digital cinema theaters lack in experience or skill with digital equipment, so they cannot perform color calibration of the projectors themselves. Furthermore, although outside professionals commissioned for such purpose can perform accurate calibrations, cinema theaters face the problem of paying expensive calibration costs every day, every week, or every month.

SUMMARY OF THE INVENTION

In view of the above, the present invention provides a technique for providing display information which can promote a user environment for always keeping the brightness and contrast of a display device, e.g., a digital projector at the same optimum state.

Further, the present invention provides a technique for providing characterization and color patch display in which a mobile display device can be utilized as a calibration tool.

Furthermore, the present invention provides a technique for providing display information which can make the colors of a color patch of a projector projected on a screen match the colors of a color patch displayed on a mobile display device.

In accordance with a first aspect of the present invention, there is provided an apparatus for providing display information for color calibration of a display device, the apparatus including: an input unit for inputting user input information; a preprocessing unit for preprocessing the user input information input by the input unit to generate a color patch for brightness adjustment and a color patch for contrast adjustment; and a color patch display unit for displaying and outputting the color patch for brightness adjustment and the color patch for contrast adjustment that are generated by the preprocessing unit.

In accordance with a second aspect of the present invention, there is provided a method for providing display information for color calibration of a display device, the method including: when a color temperature of the display device is set, displaying a color patch for brightness adjustment of the display device; upon completion of brightness adjustment of the display device, displaying a color patch for contrast adjustment of the display device; and upon completion of contrast adjustment of the display device, displaying the color patches for the display device whose brightness and contrast are adjusted.

A technique for providing display information for color calibration of a display device, e.g., a digital cinema projector in accordance with the present invention has the following characteristics.

First, a preheating process is performed by turning on the power for a predetermined time period in order to keep the color characteristics of a fixed display device, a color temperature setting process is performed to set the color temperature of the fixed display device for digital cinema use, the brightness and contrast are adjusted in order to adjust the gray scale characteristics for each channel of red, green, blue, and gray, and a color patch is displayed on a mobile display device and the fixed display device, respectively, in order for a projectionist to perform color calibration while comparing color information of the fixed display device and color information of the mobile display device.

Second, the characterization of the mobile display device for displaying correct colors is realized by modeling the color representation characteristics of the mobile display device for displaying a color patch for the calibration of the fixed display device, and the color temperature of the mobile display device can be set to the same color temperature of the fixed display device using a result of the characterization.

Third, a color adjustment function for adjusting the colors for R/G/B channels of a display device can be performed so that color information of a color patch displayed on the mobile display device and color information of a color patch displayed on the fixed display device (or on the screen) can be displayed visually identically.

In accordance with the present invention, the user can easily perform calibration on a display device such as a projector used in digital cinema theaters without the need for experts or expensive measuring equipment, and the color state of a digital cinema projector can be always kept constant. Moreover, color calibration can be performed on a display device using digital video contents, such as a digital TV and a PC monitor used at home, as well as on a digital cinema projector, and thus consistent color quality can be maintained.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, an embodiment of the present invention will be described in detail with reference to the accompanying drawings which form a part hereof.

Figure 1:
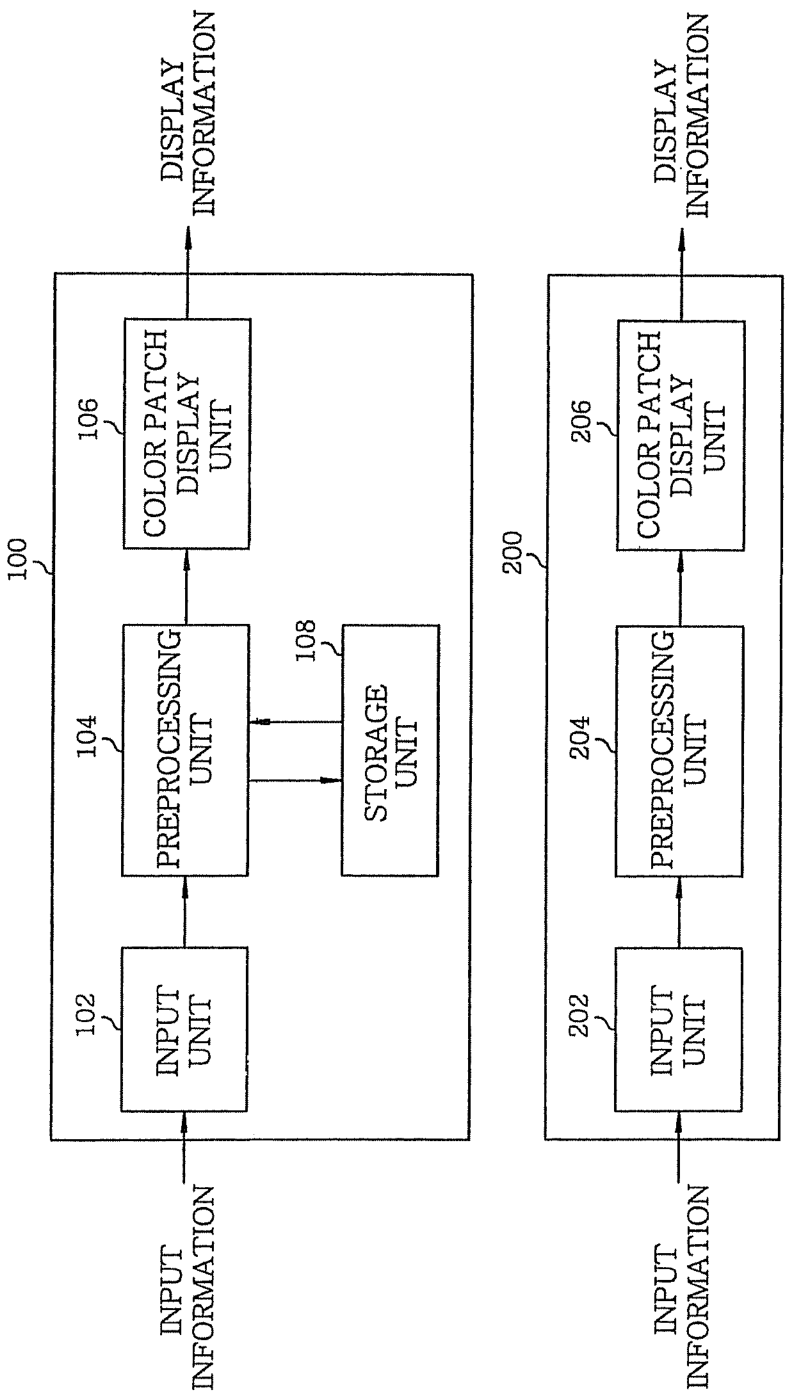
FIG. 1 shows a block diagram of an apparatus for providing display information for color calibration of a display device in accordance with an embodiment of the present invention.

FIG. 1 shows a block diagram of an apparatus for providing display information for color calibration of a display device in accordance with an embodiment of the present invention. The apparatus shown in FIG. 1 includes an input unit 102, a preprocessing unit 104, a color patch display unit 106, and a storage unit 108, which are disposed in a fixed display device 100, and an input unit 202, a preprocessing unit 204, and a color patch display unit 206, which are disposed in a mobile display unit 200.

Examples of the fixed display device 100 include a digital projector, a digital TV, a PC monitor, and the like. Here, the digital TV and the PC monitor may include a liquid crystal display (LCD) device, a light emitting diode (LED) device, an organic LED (OLED) device, or the like.

In the fixed display device 100, the input unit 102 is a key input unit which can be formed on the front panel of the fixed display device 100 or on a remote control. As described later, the input unit 102 can provide a key input environment in which a user can input a preheating signal, color temperature information, brightness information, contrast information, and the like for stabilization of the fixed display device 100.

The preprocessing unit 104 serves to generate a color patch for brightness adjustment and/or a color patch for contrast adjustment by preprocessing input information input by the input unit 102 and to provide the generated color patch for brightness adjustment and/or color patch for contrast adjustment to the color patch display unit 106 or the storage unit 108 to be described later.

The color patch display unit 106 serves to display and output the color patch for brightness adjustment or the color patch for contrast adjustment which is preprocessed by the preprocessing unit 104.

The preprocessing unit 104 and the color patch display unit 106 will be described in detail below with reference to in FIG. 2.

The storage unit 108 serves to temporarily store the color patch for brightness adjustment and/or the color patch for contrast adjustment which is preprocessed by the preprocessing unit 104.

Examples of the mobile display device 200 may include a PDA, a CDMA phone, a WCDMA phone, a smart phone and the like. Like the above-described fixed display device 100, the mobile display device 200 may include an LCD device, an LED device, an OLED device, or the like.

In the mobile display device 200, the input unit 202 is a key input means which can be formed on the front panel of the mobile display device 200. As described later, the input unit 202 can provide a key input environment in which a user can input a preheating signal, color temperature information, brightness information, contrast information, and the like for stabilization of the mobile display device 200.

The preprocessing unit 204 serves to generate a color patch for brightness adjustment and/or a color patch for contrast adjustment by preprocessing input information input by the input unit 202 and to provide the generated color patch for brightness adjustment and/or color patch for contrast adjustment to the color patch display unit 206 to be described later.

The color patch display unit 206 serves to display and output the color patch for brightness adjustment or the color patch for contrast adjustment which is preprocessed by the preprocessing unit 204.

Figure 2:
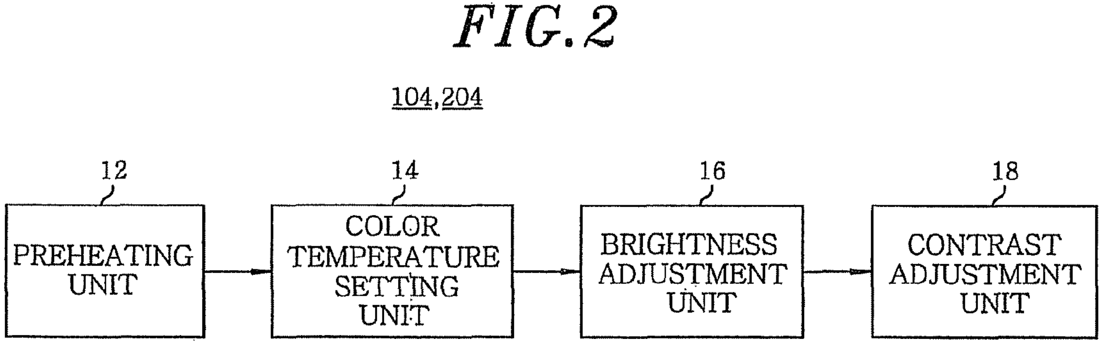
FIG. 2 is a block diagram illustrating details of a preprocessing unit of the fixed display device or the mobile display device shown in FIG. 1.

FIG. 2 is a block diagram illustrating details of the preprocessing unit 104 or 204 of the fixed display device 100 or of the mobile display device 200 of FIG. 1 described above. In the following embodiment, a description will be made representatively of the preprocessing unit 104 of the fixed display device 100 in order to avoid overlapping descriptions.

As illustrated in FIG. 2, the preprocessing unit 104 in accordance with this embodiment includes a preheating unit 12, a color temperature setting unit 14, a brightness adjustment unit 16, and a contrast adjustment unit 18.

The preheating unit 12 can perform a preheating operation for stabilization of the fixed display device 100 in response to a preheating signal input by the input unit 102 of FIG. 1 described above.

The color temperature setting unit 14 serves to set a color temperature required for the fixed display device 100, for example, the same color temperature as that of an image to be used for digital cinema depending on color temperature information input by the input unit 102.

The brightness adjustment unit 16 serves to adjust the brightness of the fixed display device 100 depending on brightness information input by the input unit 102.

More specifically, the brightness adjustment unit 16 allows a color patch for brightness adjustment to be displayed by the color patch display unit 106, and the user can input predetermined brightness information by the input unit 102 while checking the color patch for brightness adjustment by the naked eye.

Figure 3:
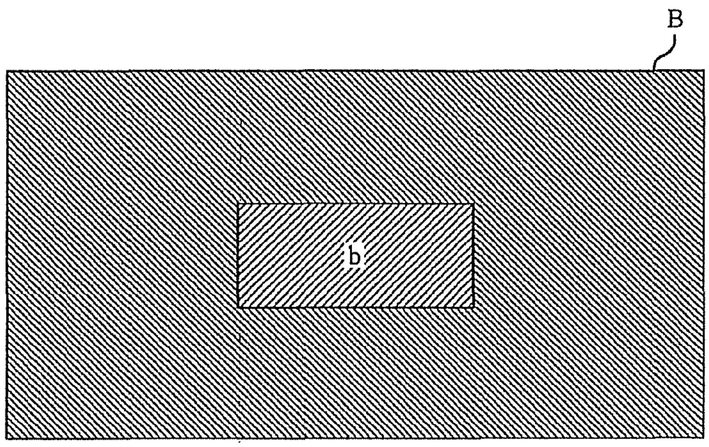
FIG. 3 is a view illustrating a color patch for brightness adjustment performed by the brightness adjustment unit shown in FIG. 2.

At this point, the color patch for brightness adjustment which can be displayed and output by the color patch display unit 106 is as illustrated in FIG. 3.

As illustrated in FIG. 3, the color patch for brightness adjustment can be displayed (projected on a screen in the case of a projector) in a manner that a black rectangular box (b)

specialized for the fixed display device 100 is included in a black background (B) in order to set the color of the black part of the fixed display device always to the same state. At this point, the black background (B) may have gray scale characteristics for each channel of, for example, red=0, green=0, and blue=0, and the black rectangular box (b) may have gray scale characteristics for each channel of, for example, red=5, green=5, and blue=5.

The user can adjust brightness to such a level as to make it impossible to distinguish between the color of the black background (B) and the color of the rectangular box (b) using an image brightness adjustment button (not shown) on the input unit 102 while checking a displayed or projected image by the naked eye.

Meanwhile, the contrast adjustment unit 18 serves to adjust the contrast of the fixed display device 100 depending on contrast information input by the input unit 102.

To be more specific, the contrast adjustment unit 16 displays the color patch for contrast adjustment by the color patch display unit 106. The user can input predetermined contrast information by the input unit while checking the color patch for contrast adjustment by the naked eye.

Figure 4:
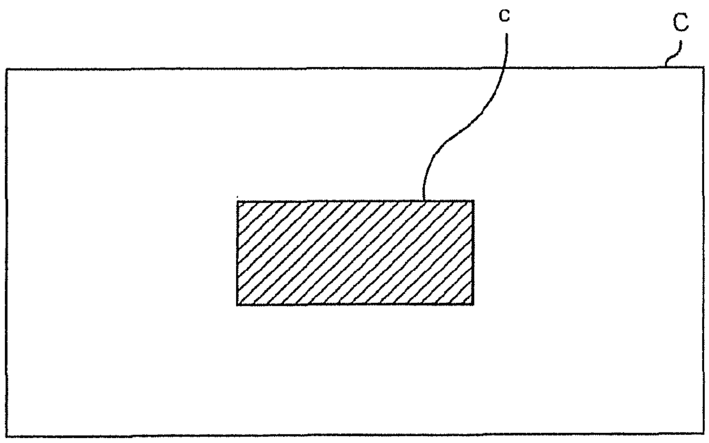
FIG. 4 is a view illustrating a color patch for contrast adjustment performed by the contrast adjustment unit shown in FIG. 2.

At this point, the color patch for contrast adjustment which can be displayed and output by the color patch display unit 106 is as illustrated in FIG. 4.

As illustrated in FIG. 4, the color patch for contrast adjustment can be displayed (projected on a screen in the case of a projector) in a manner that a white rectangular box (c) specialized for the fixed display device 100 is included in a white background (C) in order to set the color of the white part of the fixed display device 100 always to the same state. At this point, the white background (C) may have gray scale characteristics for each channel of, for example, red=255, green=255, and blue=255, and the white rectangular box (c) may have gray scale characteristics for each channel of, for example, red=250, green=250, and blue=250.

The user can adjust contrast to such a level as to make it impossible to distinguish between the color of the white background (C) and the color of the rectangular box (c) using an image contrast adjustment button (not shown) on the input unit 102 while checking a displayed or projected image by the naked eye.

After completion of the preprocessing of the fixed display device 200, the preprocessing of the mobile display device 100 is performed in a similar manner to the above, which will be described briefly.

First, a preheating step can be performed by turning on the power of the mobile display device 200 to make it reach a stabilized state.

Then, the color temperature of the mobile display device 200 can be set to the same color temperature as that of an image used for digital cinema.

Next, as shown in the above FIG. 3, a black rectangle specialized for the mobile display device is displayed on the black background, and then brightness can be adjusted using the brightness adjustment function so that the two black rectangles are not distinguishable from each other.

Subsequently, as shown in the above FIG. 4, a white rectangle specialized for the mobile display device is displayed on the white background, and then contrast can be adjusted using the contrast adjustment function so that the two white rectangles are not distinguishable from each other.

In this way, upon completion of the calibration of the mobile display device 200, an image obtained by applying the result of color characterization of the mobile display device 200 is displayed for calibration of the fixed display device 100.

A process of performing color calibration of the fixed display device 100 upon completion of the preprocessing of the fixed display device 100 for calibration purpose will be discussed.

Using the preprocessed fixed display device 100, a color patch for color calibration can be displayed (or projected on the screen).

The same color patch as that displayed (or projected on the screen) in this way can be displayed on the mobile display device 200.

While comparing the same color patches displayed on the different display devices by eye, the user can perform adjustment on the colors of the color patch displayed on the fixed display device 100 with reference to the colors of the color patch displayed on the mobile display device 200 until the two color patches appear to have the same color using the color adjustment function for each channel of red, green, and blue.

Upon completion of the adjustment of one of the color patches, the next color patch is displayed on the two display devices 100 and 200, respectively, and adjustment is performed on predetermined color patches so as to make the colors displayed (or projected on the screen) match the colors displayed on the mobile display device 200. Resultantly, color calibration of the fixed display device is completed.

Hereinafter, with the above-described configuration, a process for providing display information for color calibration of a display device in accordance with the embodiment of the present invention will be described in detail with reference to the accompanying flowcharts of FIGS. 5 and 6.

Figure 5:
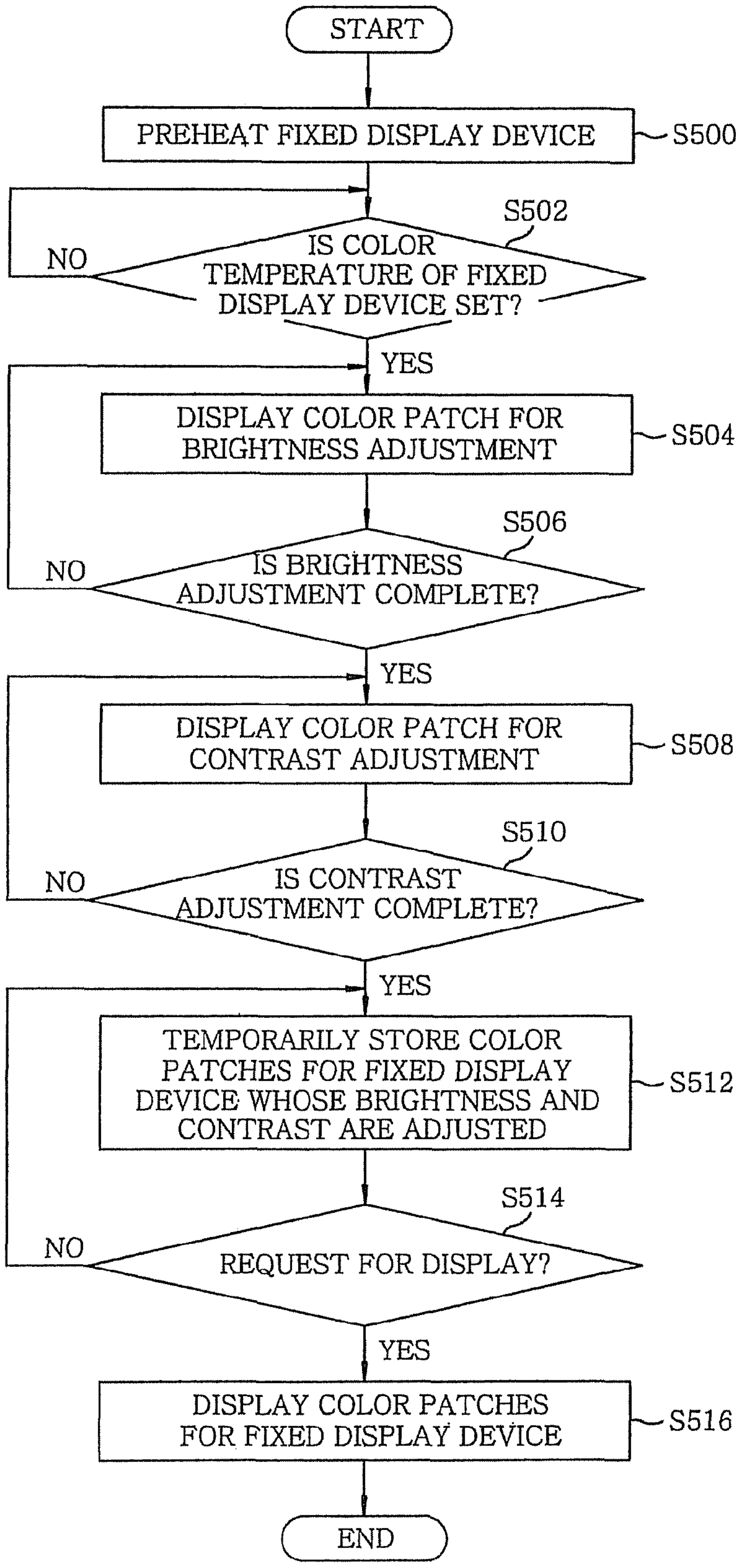
FIG. 5 is a flow chart illustrating a process for providing display information for color calibration of the fixed display device in accordance with the embodiment of the present invention.

First, FIG. 5 illustrates a procedure for providing display information for calibration of the fixed display device 100.

As illustrated in FIG. 5, preheating can be performed for stability of the fixed display device 100 in step S500.

Next, in step S502, when predetermined color temperature information is input by the input unit 102, the color temperature setting unit 14 can set the color temperature of the fixed display device 100 to a color temperature used for digital cinema, for example, depending on the input color temperature information.

Thereafter, in step S504, the brightness adjustment unit 16 can provide a command to display a color patch for brightness adjustment by the color patch display unit 106. As illustrated in FIG. 3, the color patch for brightness adjustment can be displayed in a manner that a black rectangular box (b) having gray scale characteristics for each channel of red=5, green=5, and blue=5 specialized for the fixed display device 100 is included in a black background (B) having gray scale characteristics for each channel of red=0, green=0, and blue=0.

After displaying the color patch for brightness adjustment, it is determined in step S506 whether or not predetermined brightness information is input by the input unit 102. Upon completion of inputting of brightness information, the contrast adjustment unit 18 in the preprocessing unit 104 can provide a command to display a color patch for contrast adjustment by the color patch display unit 106 in step S508. As illustrated in FIG. 4, the color patch for contrast adjustment can be displayed in a manner that a white rectangular box (c) having gray scale characteristics for each channel of red=255, green=255, and blue=255 specialized for the fixed display device 100 is included in a white background (C) having gray scale characteristics for each channel of red=250, green=250, and blue=250.

After displaying the color patch for contrast adjustment, it is determined in step S510 whether or not predetermined brightness information is input by the input unit 102. Upon completion of inputting of brightness information, the storage unit 108 in the fixed display device 100 can temporarily store the color patches for the fixed display device 100 whose brightness and contrast are adjusted in step S512.

Afterwards, when the user makes a request for display for color comparison with the mobile display device 200 in step S514, the color patches for the fixed display device 100 whose brightness and contrast are adjusted, which are temporarily stored in the storage unit 108, can be displayed and output by the color patch display unit 106 in step S516.

Figure 6:
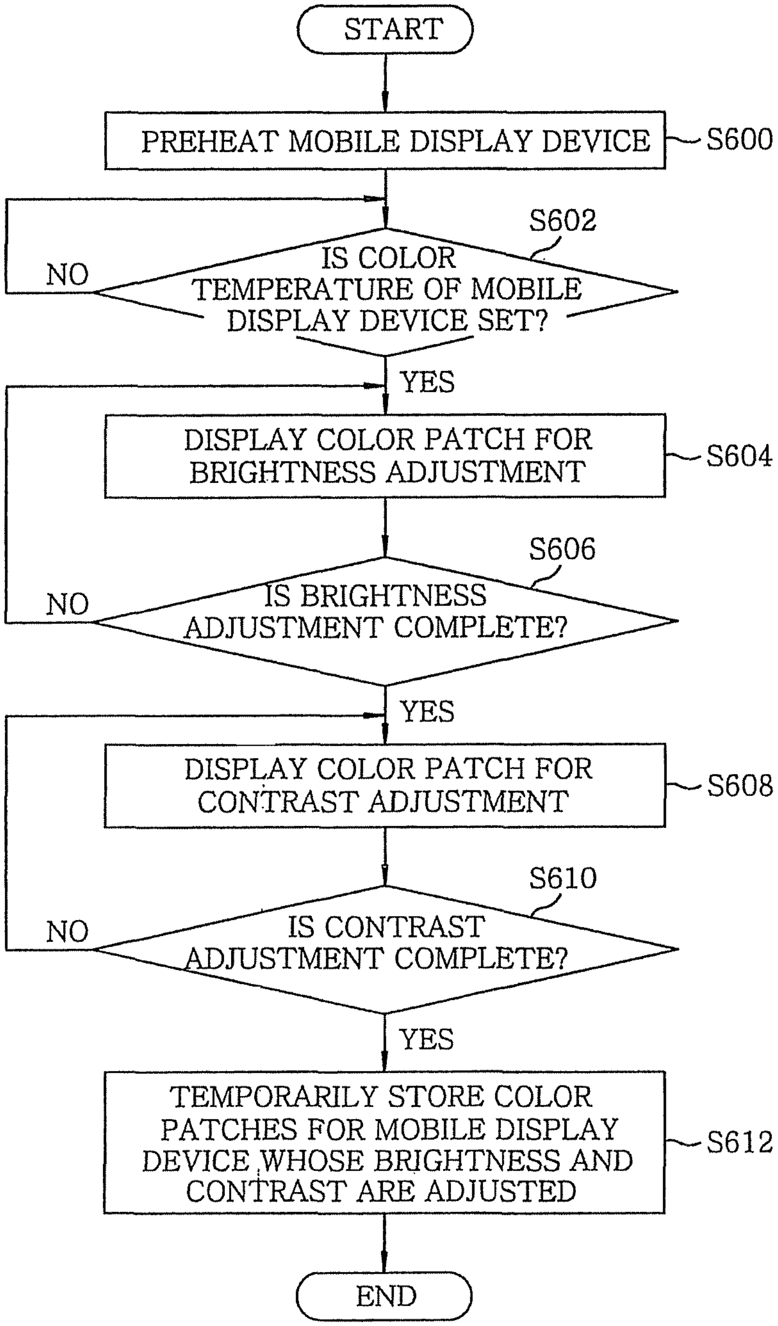
FIG. 6 is a flow chart illustrating a process for providing display information for color calibration of the mobile display device in accordance with the embodiment of the present invention.

FIG. 6 is an illustration of a process for providing display information for calibration of the mobile display device 200.

As illustrated in FIG. 6, preheating can be performed for stability of the mobile display device 200 in step S600.

Next, when predetermined color temperature information is input by the input unit 202, the color temperature setting unit 14 can set the color temperature of the mobile display device 200 to a color temperature used for digital cinema, for example, depending on the input color temperature information in step S602.

Afterwards, in step S604, the brightness adjustment unit 16 can provide a command to display a color patch for brightness adjustment by the color patch display unit 206. As illustrated in FIG. 3, the color patch for brightness adjustment can be displayed in a manner that a black rectangular box (b) having gray scale characteristics for each channel of red=5, green=5, and blue=5 specialized for the mobile display device 200 is included in a black background (B) having gray scale characteristics for each channel of red=0, green=0, and blue=0.

After displaying the color patch for brightness adjustment, it is determined whether or not predetermined brightness information is input by the input unit 202 in step S606. Upon completion of inputting of brightness information, the contrast adjustment unit 18 in the preprocessing unit 104 can provide a command to display a color patch for contrast adjustment by the color patch display unit 206 in step S608. As illustrated in FIG. 4, the color patch for contrast adjustment can be displayed in a manner that a white rectangular box (c) having gray scale characteristics for each channel of red=255, green=255, and blue=255 specialized for the mobile display device 200 is included in a white background (C) having gray scale characteristics for each channel of red=250, green=250, and blue=250.

After displaying the color patch for contrast adjustment, it is determined in step S610 whether or not predetermined brightness information is input by the input unit 202. Upon completion of inputting of contrast information, the color patches for the mobile display device 200 whose brightness and contrast are adjusted can be displayed and output by the color patch display unit 206 in the mobile display unit 200 in step S612.

That is, in this embodiment, preprocessing is performed to achieve the same gray scale representation all the time by adjusting the brightness and contrast of a fixed display device, e.g., a projector (FIG. 5), upon completion of the preprocessing of calibration of the projector, preprocessing is likewise performed on a mobile display device, e.g., a smart phone (FIG. 6), a color patch obtained as a result of the preprocessing of the projector and a color patch obtained as a result of the preprocessing of the smart phone are displayed and compared by the naked eye to see if information of the two displays is identical, and upon completion of color calibration of the projector as a result of the comparison, digital cinema contents can be presented on the projector.

While the invention has been shown and described with respect to the particular embodiments, it will be understood by those skilled in the art that various changes and modification may be made without departing from the scope of the invention as defined in the following claims.

What is claimed is:

1. An apparatus for providing display information for color calibration of a display device, the apparatus comprising:
- an input unit for inputting user input information;
- a preprocessing unit for preprocessing the user input information input by the input unit to generate a color patch for brightness adjustment and a color patch for contrast adjustment; and
- a color patch display unit for displaying and outputting the color patch for brightness adjustment and the color patch for contrast adjustment that are generated by the preprocessing unit,
- wherein the user input information is any one of a preheating signal, color temperature information, brightness information, and contrast information, and
- wherein the preprocessing unit includes:
  - a preheating unit for performing a preheating operation for stabilization of the display device in response to the preheating signal input by the input unit;
  - a color temperature setting unit for setting a color temperature required for the display device depending on the color temperature information input by the input unit;
  - a brightness adjustment unit for adjusting the brightness of the display device depending on the brightness information input by the input unit; and
  - a contrast adjustment unit for adjusting the contrast of the display device depending on the contrast information input by the input unit.

2. The apparatus of claim 1, wherein the brightness adjustment unit allows the color patch for brightness adjustment to be displayed by the color patch display unit for color calibration of the display device.

3. The apparatus of claim 1, wherein the contrast adjustment unit allows the color patch for contrast adjustment to be displayed by the color patch display unit for color calibration of the display device.

4. The apparatus of claim 2, wherein the color patch for brightness adjustment includes a black rectangular box on a black background to set the color of a black part of the display device.

5. The apparatus of claim 4, wherein the black background has gray scale characteristics for each channel of red=0, green=0, and blue=0.

6. The apparatus of claim 4, wherein the black rectangular box has gray scale characteristics for each channel of red=5, green=5, and blue=5.

7. The apparatus of claim 3, wherein the color patch for contrast adjustment includes a white rectangular box on a white background to set the color of a white part of the fixed display device.

8. The apparatus of claim 7, wherein the white background has gray scale characteristics for each channel of red=255, green=255, and blue=255.

9. The apparatus of claim 7, wherein the white rectangular box has gray scale characteristics for each channel of red=250, green=250, and blue=250.

10. The apparatus of claim 1, wherein the display device is a mobile display device.

11. The apparatus of claim 1, further comprising:
- a storage unit for temporarily storing the color patch for brightness adjustment and the color patch for contrast adjustment that are generated by the preprocessing unit and then providing the stored color patch for brightness adjustment and color patch for contrast adjustment to the color patch display unit upon receipt of a request for display from the input unit.

12. The apparatus of claim 1, wherein the display device is a fixed display device.

13. A method for providing display information for color calibration of a display device, the method comprising:

when a color temperature of the display device is set, displaying a color patch for brightness adjustment of the display device;

upon completion of brightness adjustment of the display device, displaying a color patch for contrast adjustment of the display device; and upon completion of contrast adjustment of the display device, displaying the color patches for the display device whose brightness and contrast are adjusted, wherein each displaying is performed by an apparatus, the apparatus comprising:

an input unit for inputting user input information;

a preprocessing unit for preprocessing the user input information input by the input unit to generate the color patch for brightness adjustment and the color patch for contrast adjustment; and a color patch display unit for displaying and outputting the color patch for brightness adjustment and the color patch for contrast adjustment that are generated by the preprocessing unit, the user input information is any one of a preheating signal, color temperature information, brightness information, and contrast information, and the preprocessing unit includes:

a preheating unit for performing a preheating operation for stabilization of the display device in response to the preheating signal input by the input unit;

a color temperature setting unit for setting a color temperature required for the display device depending on the color temperature information input by the input unit;

a brightness adjustment unit for adjusting the brightness of the display device depending on the brightness information input by the input unit; and a contrast adjustment unit for adjusting the contrast of the display device depending on the contrast information input by the input unit.

14. The method of claim 13, wherein the color patch for brightness adjustment includes a black background having gray scale characteristics for each channel of red=0, green=0, and blue=0, and a black rectangular box formed within the black background and having gray scale characteristics for each channel of red=5, green=5, and blue=5.

15. The method of claim 13, wherein the color patch for contrast adjustment includes a white background having gray scale characteristics for each channel of red=255, green=255, and blue=255, and a white rectangular box formed within the white background and having gray scale characteristics for each channel of red=250, green=250, and blue=250.

16. The method of claim 13, wherein the display device is a mobile display device.

17. The method of claim 13, wherein apparatus further performs:

temporarily storing the color patches for the display device whose brightness and contrast are adjusted; and displaying the color patches for the display device whose brightness and contrast are adjusted upon receipt of a request for display.

18. The method of claim 13, wherein the display device is a fixed display device.

* * * * *